May 8, 1945.  J. D. LANGDON  2,375,240
COMBAT VEHICLE
Filed Jan. 17, 1942    2 Sheets-Sheet 2
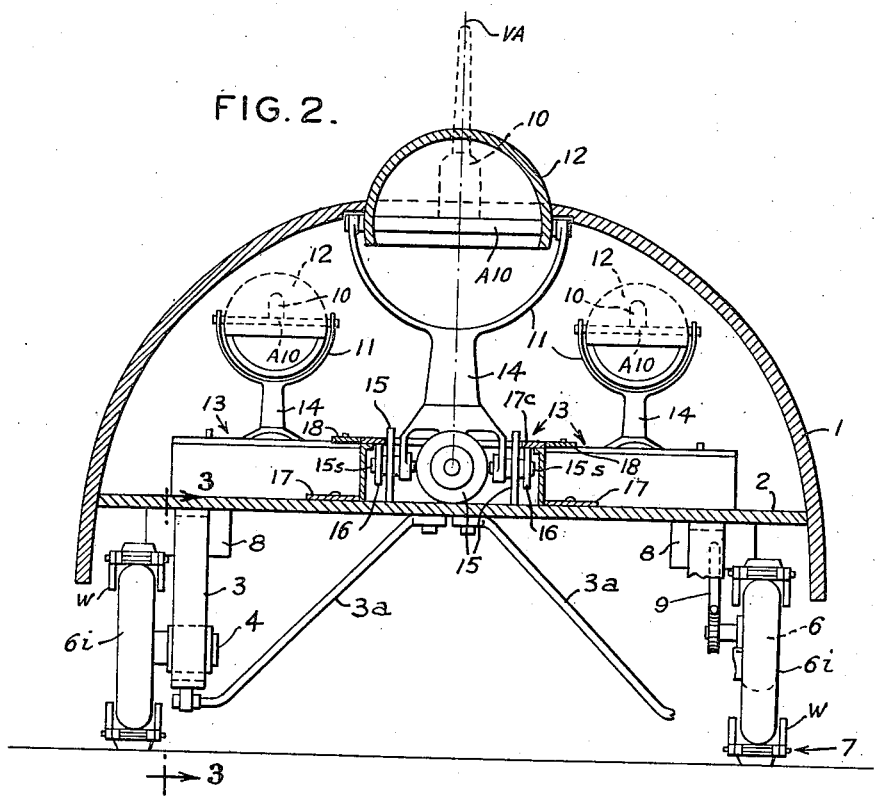
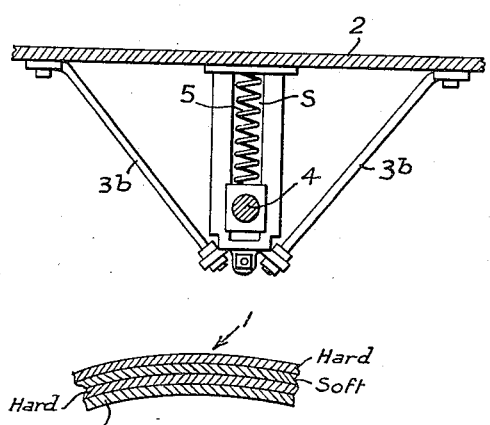
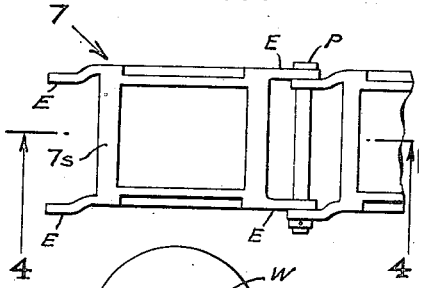
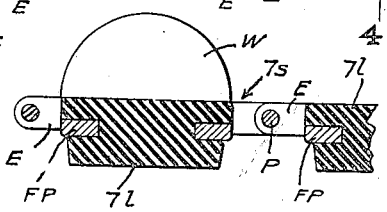
INVENTOR
J. D. LANGDON
BY
ATTORNEY Patented May 8, 1945

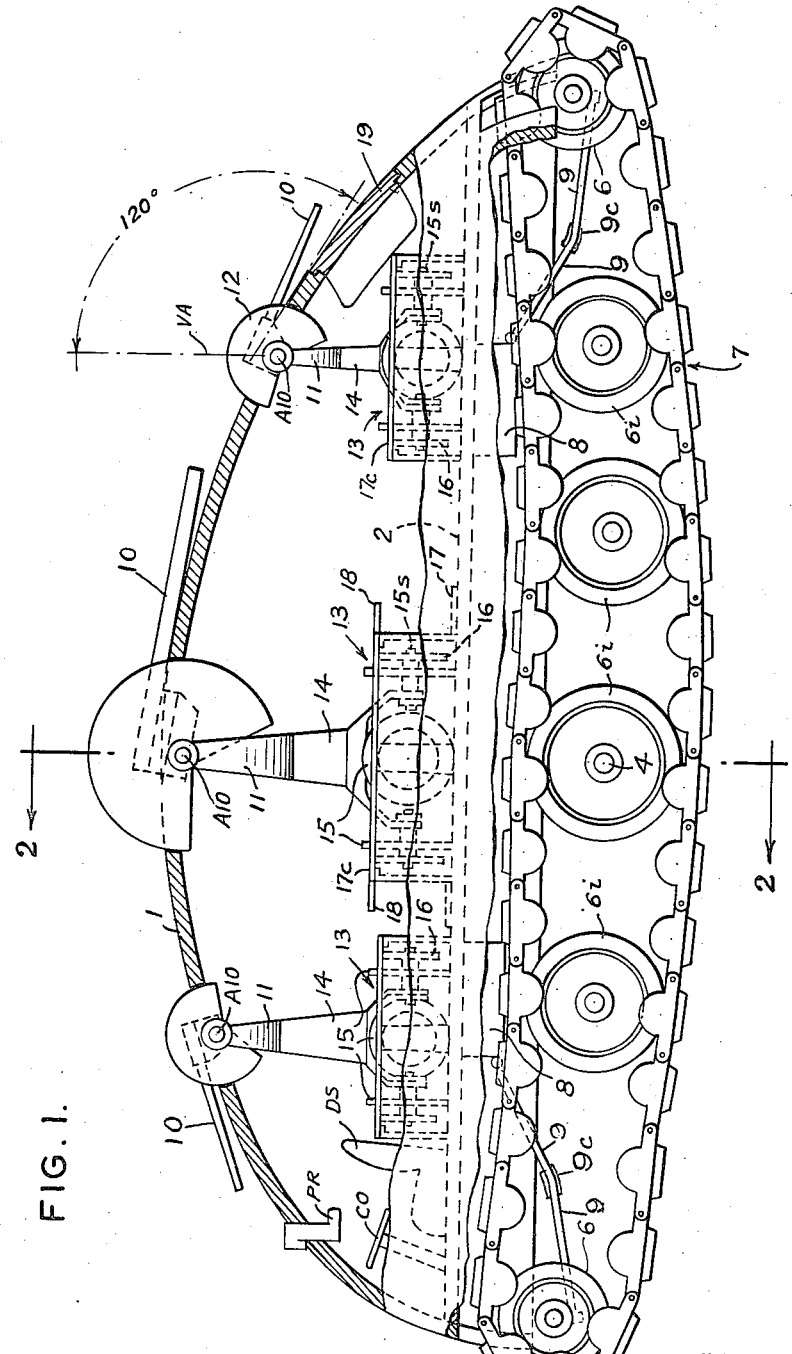

2,375,240

UNITED STATES PATENT OFFICE 2,375,240

COMBAT VEHICLE

Jesse D. Langdon, Downey, Calif.

Application January 17, 1942, Serial No. 427,117

3 Claims. (Cl. 89—40)

The invention relates to tanks or war vehicles and aims to devise a machine embodying maximum efficiency, simple construction and low manufacturing costs with high rate-production capabilities.

Primary objects in the invention are:

1. To provide a high speed vehicle having maximum mobility by connecting a separate driving mechanism to each traction wheel and intervening idling wheels to take up slack in a flexible track carried by said traction wheel.

2. To provide pneumatic tires and easily replaceable traction wheels slidable in trunnions for mounting same.

3. To provide cannon and gun trunnions and mountings of simple structure capable of quick training on targets with simple mechanism permitting movement of 120 or more angular degrees on a vertical arc, and a full circle in a horizontal plane.

4. To provide quickly and easily replaceable component elements for the entire tank structure.

5. To provide a track wholly or in part replaceable and requiring a minimum of time and effort in such replacement.

6. To provide a partly spherical armored, turtle-back armored chassis cover, offering a minimum of irregular or rough surface into which a shell or bullet may bite and of such shape and toughness that the liability of penetration by gun fire is minimized to a great extent.

7. To provide a partly spherical shield mounting with a gun or cannon and eliminate slots in turrets, affording a maximum quick mobility for training a gun on targets.

8. To provide a low center of gravity for the vehicle and a minimum of exposed target surface.

9. To provide an efficient fortification in the event that the vehicle is immobilized by gun fire.

10. To provide tank or vehicle combinations having synchronized mechanical organizations.

The following is a specification.

The reduction to practice as of the drawings is for the purpose of illustration only, and it is understood any departure from the structure shown is permissible within the scope of the claims.

Like numbers indicate like parts throughout.

In the drawings:

Fig. 1 is a diagrammatic view illustrating the relative positions of the various elements constituting one preferred form of the invention substantially as would appear if a longitudinal section of the invention were illustrated.

Fig. 2 is a vertical section of the tank on line 2—2 of Fig. 1.

Fig. 3 is a detail side elevational view of a wheel and track trunnion assembly, and the mounting of a portion of the deck, taken on section line 3—3 of Fig. 2.

Fig. 4 is a detail longitudinal sectional view of a portion of a stamped traction block section of the track.

Fig. 5 is an under side view of a traction block section.

Fig. 6 shows a fragmentary transverse sectional portion of the turtle back illustrating laminated structure.

The organization of the structure of the illustrated preferred embodiment of the invention comprises a turtle back or domed armor superstructure 1, built preferably of substantially one continuous piece, mounted above a deck 2, having slotted trunnions 3 depending therefrom. An axle slot S, provided by wheel trunnions 3 has disposed therethrough an axle stub 4; transverse trunnion braces 3a are provided against lateral stresses. Attached below the lower end of axle slot S, longitudinal trunnion braces 3b are provided, converging to the lower end of slot S. A coil spring 5 is disposed in trunnion axle slot S for each demountable traction wheel 6, mounted on an axle stud 4, which works up and down in slot S.

A track 7 made up of traction block segments 7s, preferably stamped of sheet metal, having wings w turned up, paralleling traction wheels 6 and idler wheel 6i. A lug 7l, made preferably of a composition of rubber and fabric, is moulded into a square perforation through the flat portion FP of segments 7s. Pins P are provided through ears E to join segments 7s together, the ears E being interlapped in staggered order, each segment 7s being stamped in identical form and interchangeable with one another.

Engines 8 are mounted under the deck 2 and connected to each driving wheel 6, thus the tank may still be moved, if powered, by only one engine in the event that the others are out of commission and if the vehicle is otherwise in condition to move. The shafts 9 are preferably connected with universal joints 9c between each engine and wheel. If desired, the engine may be connected to traction wheels 6.

The guns 10 are mounted on yoke trunnions 11 and assembled together with partly spherical shields forming turrets 12, each preferably made of steel sheets laminated together or of cast steel armor plate and are attached rigidly to the gun mounting axis A10, where light guns are used with solid mountings. However, shock absorbing cylinders combined with the trunnion 11 may be used if the gun 10 is mounted independently on the same axis A10 common to the partly spherical turret or shield 12, the gun 10 projecting through a suitable orifice in the wall of turret 12, thus affording movement of barrel of gun 10. Since the gun 10 and the turret 12 rotate about horizontal and vertical axes common to both and in unison with one another, no slot is necessary in order to elevate, depress or rotate the gun 10.

The gun axis A10 is mounted below the line of turtle back 1 and less than half the diameter of the partly spherical shield 12 protrudes through suitable orifice in the turtle back. The vertical axis VA, see Fig. 1, of the carriage 13 and the horizontal axis A10 permit the guns 10 to be swung radially in a full circle and raised or depressed vertically on an arc in excess of 120 angular degrees or to any angle commensurate with the location of the gun 10 in turret 12 and the distance of axis A10 below the line of turtleback 1 underneath which the axis A10 is located.

It will be noted that no exposed embrasures for navigation are necessary in this structure, as a periscope PR, see Fig. 1, is provided forward of the driver's seat DS above controls CO.

The gun trunnion mounting and carriage 13 illustrated in Fig. 2 comprises a yoke trunnion 11 and a pedestal 14, having four wheels 15 mounted around the base thereof, by means of stubs 15s projecting through the hubs of wheels 15 and having casters 16 contacting and riding the underside of an inwardly projecting caster flange 17c constituting a portion of deck flange 17 which is bolted to deck 2. The weight of the gun 10, turret 12, and pedestal 14 is rotated and carried upon wheels 15. Casters 16 hold gun 10 down and prevent tipping of pedestal 14 when gun 10 is fired.

A gunner's walk platform 18 is provided above the floor flange 17 so the gunner can walk around and rotate the gun about the axis VA, see Fig. 2. The gun can be handled by direct control for both vertical and rotative movements, to train the gun on the target without the use of gears of any kind, thus devising a very mobile and simple direct-action gun training means practical for all but the heavier caliber cannons.

Rubber tires are preferably used for wheels 15 and casters 16 and act to cushion and absorb the firing shock of gun 10.

Doors may be provided as at 19, see Fig. 1, or the tank may be entered through a man-hole, not shown, in the deck between the tracks.

This invention is peculiarly adaptable to manufacture by the automobile industry as the regular automobile rear axle assembly and stock auto wheels can be used. The wheels 6 can be mounted on the regular automobile differential axle independent of trunnions 3 and by mounting the idler wheels 6i and trunnions adjacent the independently mounted wheels 6 to serve as guide wheels, said independently mounted wheels 6 will follow the movement of the track segments 7. In this way the regular stock rear end axles and engines used in the construction of automobiles can be used for this combat vehicle.

The differential housing assembly of the ordinary automobile can be adapted to a four wheel tank driving mechanism by merely turning the assembly over, thus reversing the drive of one pair of wheels—and leaving the differential assembly as is for the other pair of wheels. Preferably, a complete automobile assembly of engine transmission and differential assembly to each pair of wheels may be employed, with synchronizing attachments between the gear shift controls if more than one engine is used.

The combat vehicle can be steered and maneuvered by using independent brakes attached to the opposite driving wheels 6, disposed opposite to one another; thus one or the other set of wheels may be braked and the vehicle caused to circle one way or the other according to the application of the brakes—the differential gears allowing for this movement.

Whereas I have described my invention by reference to specific forms thereof, it will be understood that many changes and modifications may be made without departing from the spirit of the invention.

I claim:

1. A combat vehicle comprising a gun compartment having an armored wall structure of turtle back exterior contour, said wall structure formed with a generally circular aperture therein, a gun turret having a portion of the exterior thereof of spherical contour, means mounting said turret on said vehicle with the spherical portion of the turret extending thru the aperture in the turtle back of the vehicle, said mounting means including a member rotatable on an axis passing thru the center of the aperture and normal to the projection of the surface of the wall structure at that point and an element mounting said turret on said member for swinging about an axis at right angles to the axis of said rotatable member and passing thru the center of said spherical portion of said turret and lying within the outer contour of said turtle back, and a gun mounted in said turret and having its barrel extending thru said turret, said mounting being so constructed, arranged and positioned whereby the gun barrel will lie tangential to the outer surface of the armored wall structure adjacent the said aperture in the lowermost position of gun elevation in any direction.

2. A combat vehicle as of claim 1 wherein the means mounting the turret in the gun compartment of the vehicle comprises a floored cylindrical housing having a flange disposed radially inward of the housing, a pedestal standing centrally of the housing and the aperture for the turret with at least three wheels mounted on axles radiating from the base of the pedestal and riding on the floor of the housing, castors mounted on an axle common to the wheels and riding underneath the flange whereby the pedestal can be rotated with the gun and turret and prevented from tipping.

3. A combat vehicle as of claim 1 wherein the means mounting the turret in the gun compartment of the vehicle comprises a floored cylindrical housing having a flange disposed radially inward of the housing, a pedestal standing centrally of the housing and the aperture for the turret with at least three wheels mounted on axles radiating from the base of the pedestal and riding on the floor of the housing, castors mounted on an axle common to the wheels and riding underneath the flange whereby the pedestal can be rotated with the gun and turret and prevented from tipping, pneumatic tires mounted on the wheels and castors to cushion the recoil of the gun.

JESSE D. LANGDON.